(12) United States Patent
Hayakawa et al.

(10) Patent No.: US 8,201,677 B2
(45) Date of Patent: Jun. 19, 2012

(54) CLUTCH HYDRAULIC SYSTEM FOR VEHICLE AND HYDRAULIC SYSTEM

(75) Inventors: Koshi Hayakawa, Saitama (JP); Kanau Iwashita, Saitama (JP); Yoshihisa Ieda, Saitama (JP); Katsumi Sahoda, Saitama (JP); Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 952 days.

(21) Appl. No.: 12/196,765

(22) Filed: Aug. 22, 2008

(65) Prior Publication Data
US 2009/0057092 A1 Mar. 5, 2009

(30) Foreign Application Priority Data

Aug. 27, 2007 (JP) ................................. 2007-220427

(51) Int. Cl.
*F16D 25/08* (2006.01)
(52) U.S. Cl. .... 192/83; 192/85.5; 192/85.55; 192/85.57
(58) Field of Classification Search .................... 192/83, 192/85.55, 85.5, 85.6, 85.57
See application file for complete search history.

(56) References Cited

U.S. PATENT DOCUMENTS

| 4,560,049 | A | | 12/1985 | Uchibaba et al. | |
|---|---|---|---|---|---|
| 5,839,561 | A | * | 11/1998 | Koda et al. ...................... | 192/90 |
| 6,607,060 | B2 | * | 8/2003 | Inoue .............................. | 192/83 |
| 7,014,026 | B2 | * | 3/2006 | Drussel et al. ............ | 192/105 B |
| 7,204,088 | B2 | * | 4/2007 | Uchiyama et al. .............. | 60/594 |
| 7,591,358 | B2 | * | 9/2009 | Pick ................................ | 192/83 |
| 7,721,858 | B2 | * | 5/2010 | Kosugi et al. ................... | 192/20 |
| 7,828,131 | B2 | * | 11/2010 | Iwashita et al. ................. | 192/83 |

FOREIGN PATENT DOCUMENTS

| FR | 2862114 A1 | 5/2005 |
|---|---|---|
| JP | 8-296670 A | 11/1996 |

* cited by examiner

*Primary Examiner* — David D Le
*Assistant Examiner* — Jude Agendia
(74) *Attorney, Agent, or Firm* — Birch, Stewart, Kolasch & Birch, LLP

(57) ABSTRACT

A clutch hydraulic system for a vehicle wherein it is possible to independently operate two systems, to increase the degree of freedom in designing, and to achieve a reduction in cost. A seesaw member for transmitting motive power is provided between a second release cylinder and a first master cylinder, the first master cylinder and a second hydraulic oil pipe communicate with each other through a large diameter hole and a small diameter hole provided as communicating passages through which oil flows. A reservoir tank is provided for reserving the oil for controlling the amounts of the oil in the hydraulic oil passage on the side of the first master cylinder and the amount of the oil in the hydraulic oil passage on the side of the second release cylinder is connected to a second master cylinder.

21 Claims, 11 Drawing Sheets

CLUTCH HYDRAULIC SYSTEM FOR VEHICLE AND HYDRAULIC SYSTEM

CROSS-REFERENCE TO RELATED APPLICATIONS

The present application claims priority under 35 USC 119 to Japanese Patent Application No. 2007-220427 filed on Aug. 27, 2007 the entire contents of which are hereby incorporated by reference.

BACKGROUND OF THE MENTION

1. Field of the Invention

The present invention relates to a clutch hydraulic system for a vehicle and to hydraulic system.

2. Description of Background Art

As a clutch hydraulic system for a vehicle and hydraulic system according to the existing art, a system is known that includes two hydraulic systems for connecting and disconnecting an automotive clutch. See, for example, Japanese Patent Laid-open No. Hei 8-296670.

FIG. 1 of Japanese Patent Laid-open No. Hei 8-296670 will be described as follows.

Of the two hydraulic systems, one is a system for operating a master cylinder 5 by a clutch pedal 7, and the other is a system for operating a sub master cylinder 12 by a power cylinder 14. The master cylinder 5 and the sub master cylinder 12 are connected to a release cylinder 3 through a three-port valve 20, and the release cylinder 3 is connected to a clutch 1.

The master cylinder 5 is fitted with oil supplier 6, and the sub master cylinder 12 is fitted with oil supplier 13.

While the oil suppliers (reservoir tanks) 6, 13 are provided respectively in the two hydraulic systems mentioned above, it is necessary to provide the oil suppliers 6, 13 at the highest position in the hydraulic system for the purpose of supplying each of the hydraulic systems with oil, so that a plurality of layout spaces must be secured at the highest site in the hydraulic system for the purpose of arranging the plurality of oil suppliers 6, 13, resulting in that the degree of freedom in designing a clutch control system is reduced. In addition, the arrangement of the two oil suppliers 6, 13 leads to a rise in cost.

Furthermore, since the oil passages of the two systems are changed over by the three-port valve 20, the need to disconnect the clutch 1 by the clutch pedal 7 in the condition where, for example, the clutch 1 is disconnected by the power cylinder 14 cannot be fulfilled. In other words, the two hydraulic systems cannot be operated independently.

SUMMARY AND OBJECTS OF THE INVENTION

It is an object of an embodiment of the present invention to provide a clutch hydraulic system for a vehicle and hydraulic system wherein it is possible to operate two systems independently, to increase the degree of freedom in designing, and to achieve a reduction in cost.

According to an embodiment of the present invention, a clutch hydraulic system for a vehicle includes a clutch hydraulic oil passage including a clutch master cylinder for generating hydraulic pressure by motive power given thereto, and a clutch release cylinder to which hydraulic pressure is transmitted from the clutch master cylinder through a first oil pipe and which disconnects a clutch. A manual hydraulic oil passage includes a manual master cylinder operated manually to generate hydraulic pressure, and a manual release cylinder operated by hydraulic pressure transmitted from the manual master cylinder through a second oil pipe to thereby generate hydraulic pressure in the clutch master cylinder. A power transmitting member for transmitting motive power is provided between the manual release cylinder and the clutch master cylinder. The clutch master cylinder and the second oil pipe communicate with each other through a communicating passage through which oil flows. A reservoir tank reserving the oil for controlling the amounts of the oil in the clutch hydraulic oil passage and the manual hydraulic oil passage is connected to the manual master cylinder.

Thus, the reservoir tank reserving the oil is connected to the manual master cylinder, the second oil pipe is connected to the manual master cylinder and the second oil pipe communicates with the clutch master cylinder through the communicating passage, so that the clutch master cylinder is connected to the manual master cylinder and the first oil pipe is also connected to the manual master cylinder.

This ensures that, even when the amounts of the oil in the clutch hydraulic oil passage and the manual hydraulic oil passage are varied due to temperature variations or abrasion of frictional members in the clutch or the like factors, the amounts of the oil in the clutch hydraulic oil passage and the manual hydraulic oil passage are controlled through the process in which the oil in the reservoir tank is supplied into the clutch hydraulic oil passage and the manual hydraulic oil passage or in which the oil is recovered from the clutch hydraulic oil passage and the manual hydraulic oil passage into the reservoir tank.

Therefore, the single reservoir tank suffices for the two hydraulic oil passages consisting of the clutch hydraulic oil passage and the manual hydraulic oil passage, so that it becomes easy to lay out the reservoir tank, the degree of freedom in designing is increased, and a reduction in cost can be made. In addition, since the oil in the two hydraulic oil passages can be deaerated by one-time deaeration, maintainability is enhanced.

For example, when the clutch master cylinder is operated by given motive power to thereby generate hydraulic pressure, the hydraulic pressure is transmitted through the first oil pipe to the clutch release cylinder, whereby the clutch is disconnected (released).

In addition, when the manual master cylinder is manually operated to generate hydraulic pressure, the hydraulic pressure is transmitted through the second oil pipe to the manual release cylinder, hydraulic pressure is generated in the manual release cylinder, and motive power is transmitted from the manual release cylinder to the clutch master cylinder through the power transmitting member, whereby hydraulic pressure is generated in the clutch master cylinder. This hydraulic pressure is transmitted through the first oil pipe to the clutch release cylinder, whereby the clutch is disconnected (released).

It is also possible to operate the clutch master cylinder through the power transmitting member manually and independently while operating the clutch master cylinder by given motive power.

According to an embodiment of the present invention, the manual master cylinder and the reservoir tank are mounted on a handle provided on the vehicle. In addition, the manual master cylinder is operated by an operation of a clutch lever provided on the handle.

As a result of the handle being equipped with the single reservoir tank, it becomes easy to check the amount of the oil in the reservoir tank and to supply the reservoir tank with the oil.

In addition, with the single reservoir tank mounted to the handle, it is unnecessary to secure a space for arranging the reservoir tank. Thus, the degree of freedom in designing the clutch hydraulic system for a vehicle is increased.

According to an embodiment of the present invention, the piston pressure receiving area in the manual release cylinder is greater than the piston pressure receiving area in the clutch master cylinder.

This ensures that the pressure receiving area of the piston in provided the manual release cylinder is greater than the pressure receiving area of the piston provided in the clutch master cylinder.

Therefore, when the manual master cylinder is manually operated to transmit hydraulic pressure into the second oil pipe, a pushing force generated at the piston in the clutch master cylinder by this hydraulic pressure through the communicating passage is lower than a pushing force generated at the piston in the manual release cylinder, so that the pushing force is transmitted from the manual release cylinder to the clutch master cylinder through the power transmitting member.

According to an embodiment of the present invention, a manual release piston movably contained in the manual release cylinder and a clutch master piston movably contained in the clutch master cylinder are provided. The power transmitting member has one end part pushed by the manual release piston to thereby transmit motive power that is thereby turned about a center of turning, and has the other end part pressing the clutch master piston to thereby transmit motive power, the center of turning is provided between the one end part and the other end part, and the distance from the center of turning to the one end part on the manual release piston side is set to be greater than the distance from the center of turning to the other end part on the clutch master piston side.

This ensures that the moment of the portion, ranging from the center of turning to the one end part on the manual release piston side, of the power transmitting member is greater than the moment on the portion, ranging from the center of turning to the other end part on the clutch master piston side, of the power transmitting member.

Therefore, when hydraulic pressure is transmitted into the second oil pipe by manually operating the manual master cylinder, the pushing force with which the manual release piston pushes the clutch master piston through the power transmitting member is greater than the pushing force with which the clutch master cylinder pushes the manual release piston through the power transmitting member, so that a pushing force is transmitted from the manual release cylinder to the clutch master cylinder through the power transmitting member.

According to an embodiment of the present invention, the communicating passage is opened toward the lower side of the clutch master cylinder.

This ensures that, when air has penetrated into the second oil pipe, the air moves from the inside of the second oil pipe into the communicating passage on the upper side and moves from the inside of the communicating passage into the clutch master cylinder on the upper side.

According to an embodiment of the present invention, a part of a worm wheel can make contact with the power transmitting member, and the worm wheel is meshed with a worm attached to a rotary shaft of an electric motor.

This ensures that, when the electric motor is driven, the worn wheel is rotated attendant on the rotation of the worm, and a part of the worm wheel makes contact with the power transmitting member, so that the power transmitting member comes into contact with the clutch master piston and pushes the clutch master piston.

As a result, hydraulic pressure is generated in the clutch master cylinder, and this hydraulic pressure is transmitted through the first oil pipe to the clutch release cylinder, so that the clutch having been connected is disconnected (released) by the clutch release cylinder.

In addition, when the manual master cylinder is manually driven, hydraulic pressure is generated in the manual master cylinder, this hydraulic pressure is transmitted through the second oil pipe to the manual release cylinder, and the manual release cylinder drives the clutch master cylinder through the power transmitting member, thereby generating hydraulic pressure. As a result, in the same manner as above, the hydraulic pressure generated in the clutch master cylinder is transmitted to the clutch release cylinder, whereby the clutch is disconnected (released).

According to an embodiment of the present invention, the vehicle is a saddle ride type vehicle.

This ensures that, since the clutch hydraulic system for a vehicle provided in the saddle ride type vehicle includes the single reservoir tank, the body space in the saddle ride type vehicle in which to dispose the reservoir tank is reduced.

According to an embodiment of the present invention, the hydraulic system includes a first hydraulic oil passage including a first master cylinder, and a first release cylinder to which hydraulic pressure is transmitted from the first master cylinder through a first oil pipe and which generates hydraulic pressure. A second hydraulic oil passage includes a second master cylinder. A second release cylinder is operated by hydraulic pressure transmitted from the second master cylinder through a second oil pipe to thereby generate hydraulic pressure in the first master cylinder wherein the first master cylinder and the second oil pipe communicate with each other through a communicating passage through which oil flows. A reservoir tank reserving the oil for controlling the amounts of the oil in the first hydraulic oil passage and the second hydraulic oil passage is connected to the second master cylinder.

This ensures that the reservoir tank reserving the oil is connected to the second master cylinder, the second oil pipe is connected to the second master cylinder, and the second oil pipe communicates with the first master cylinder through the communicating passage, so that the first master cylinder is connected to the reservoir tank.

Therefore, even when the amounts of the oil in the first hydraulic oil passage and the second hydraulic oil passage are varied due to temperature variations or abrasion of frictional members in the clutch or the like factor, the amount of oil controlled through the process in which the oil in the reservoir tank is supplied into the first hydraulic oil passage and the second hydraulic oil passage or in which the oil is recovered from the first hydraulic oil passage and the second hydraulic oil passage into the reservoir tank.

According to an embodiment of the present invention, the power transmitting member for transmitting motive power is provided between the manual release cylinder and the clutch master cylinder, the clutch master cylinder and the second oil pipe communicate with each other through the communicating passage through which the oil flows, and the reservoir tank reserving the oil for controlling the amounts of the oil in the clutch hydraulic oil passage and the manual hydraulic oil passage is connected to the manual master cylinder. This ensures that the amount of the oil in the clutch hydraulic oil passage can be controlled by the oil in the reservoir tank, in the same manner as the amount of the oil in the manual hydraulic oil passage.

Therefore, the single reservoir tank suffices for both the manual hydraulic oil passage and the clutch hydraulic oil passage, which makes it possible to easily mount the single reservoir tank in a space around the handle, to increase the degree of freedom in designing the clutch hydraulic system for a vehicle, and to reduce the cost of the clutch hydraulic system for a vehicle. Further, the two systems consisting of the system for disconnecting (releasing) the clutch by given motive power and the system for disconnecting the clutch manually can be operated independently.

According to an embodiment of the present invention, the manual master cylinder and the reservoir tank are mounted to the handle provided in the vehicle, and the manual master cylinder is operated through a clutch lever provided on the handle. Therefore, with the single reservoir tank provided on the handle, it becomes easy to check the amount of the oil in the reservoir tank, and to supply the oil. In addition, since the single reservoir tank is attached to the handle, it is needless to secure a space in which to arrange the reservoir tank. Thus, the degree of freedom in designing the clutch hydraulic system for a vehicle can be increased.

According to an embodiment of the present invention, the piston pressure receiving area in the manual release cylinder is greater than the piston pressure receiving area in the clutch master cylinder. This makes it possible to set the pressure receiving area of the piston in the manual release cylinder to be greater than the pressure receiving area of the piston in the clutch master cylinder, to transmit a pushing force from the manual release cylinder side to the clutch master cylinder side through the power transmitting member, and to manually disconnect (release) the clutch.

According to an embodiment of the present invention, the manual release piston movably contained in the manual release cylinder and the clutch master piston movably contained in the clutch master cylinder are provided. The power transmitting member has one end part pushed by the manual release piston to thereby transmit motive power, which is thereby turned about a center of turning, and has the other end part pressing the clutch master piston to thereby transmit motive power, the center of turning is provided between the one end part and the other end part, and the distance from the center of turning to the one end part on the manual release piston side is set to be greater than the distance from the center of turning to the other end part on the clutch master piston side. This ensures that the moment on the portion, ranging from the center of turning to the one end part on the manual release piston side, of the power transmitting member can be set to be greater than the moment on the portion, ranging from the center of turning to the other end part on the clutch master piston side, of the power transmitting member, and that a pushing force can be transmitted from the manual release cylinder side to the clutch master cylinder side through the power transmitting member, thereby manually disconnecting the clutch.

According to an embodiment of the present invention, the communicating passage is opened toward the lower side of the clutch master cylinder. This ensures that at the time of deaerating the second oil pipe, air is released from the second oil pipe into and through the communicating passage on the upper side and further into the clutch master cylinder on the upper side, so that deaeration of the second oil pipe can be easily carried out.

According to an embodiment of the present invention, a part of the worm wheel can make contact with the power transmitting member, and the worm wheel is meshed with the worm attached to the rotary shaft of the electric motor. Therefore, it is possible by driving the electric motor to operate the power drive member through the worm and the worm wheel. In addition, it is possible by manually driving the manual release cylinder to operate the power drive member independently from the electric motor side.

According to an embodiment of the present invention, the vehicle is a saddle ride type vehicle. Therefore, with the saddle ride type vehicle provided with the single reservoir tank, it is possible, while securing manual clutch operation and powered clutch operation, to reduce the number of component parts, to reduce the cost of the saddle ride type vehicle and to effectively utilize the vehicle body space.

According to an embodiment of the present invention, the first master cylinder and the second oil pipe communicate with each other through the communicating passage through which the oil flows, and the reservoir tank reserving the oil for controlling the amounts of the oil in the first hydraulic oil passage and the second hydraulic oil passage is connected to the second master cylinder. This ensures that the amount of the oil in the first hydraulic oil passage can be controlled by the oil in the reservoir tank, in the same manner as the amount of the oil in the second hydraulic oil passage.

Therefore, the single reservoir tank suffices for both the first hydraulic oil passage and the second hydraulic oil passage, so that it is possible to easily mount the single reservoir tank in the highest site of the first hydraulic oil passage and the second hydraulic oil passage, to increase the degree of freedom in designing the hydraulic system, and to reduce the cost of the hydraulic system. Furthermore, the two systems consisting of the system for disconnecting the clutch by given motive power and the system for disconnecting the clutch manually can be operated independently.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below, based on the accompanying drawings. The drawings are to be viewed according to the positioning of the reference symbols.

Figure 1:
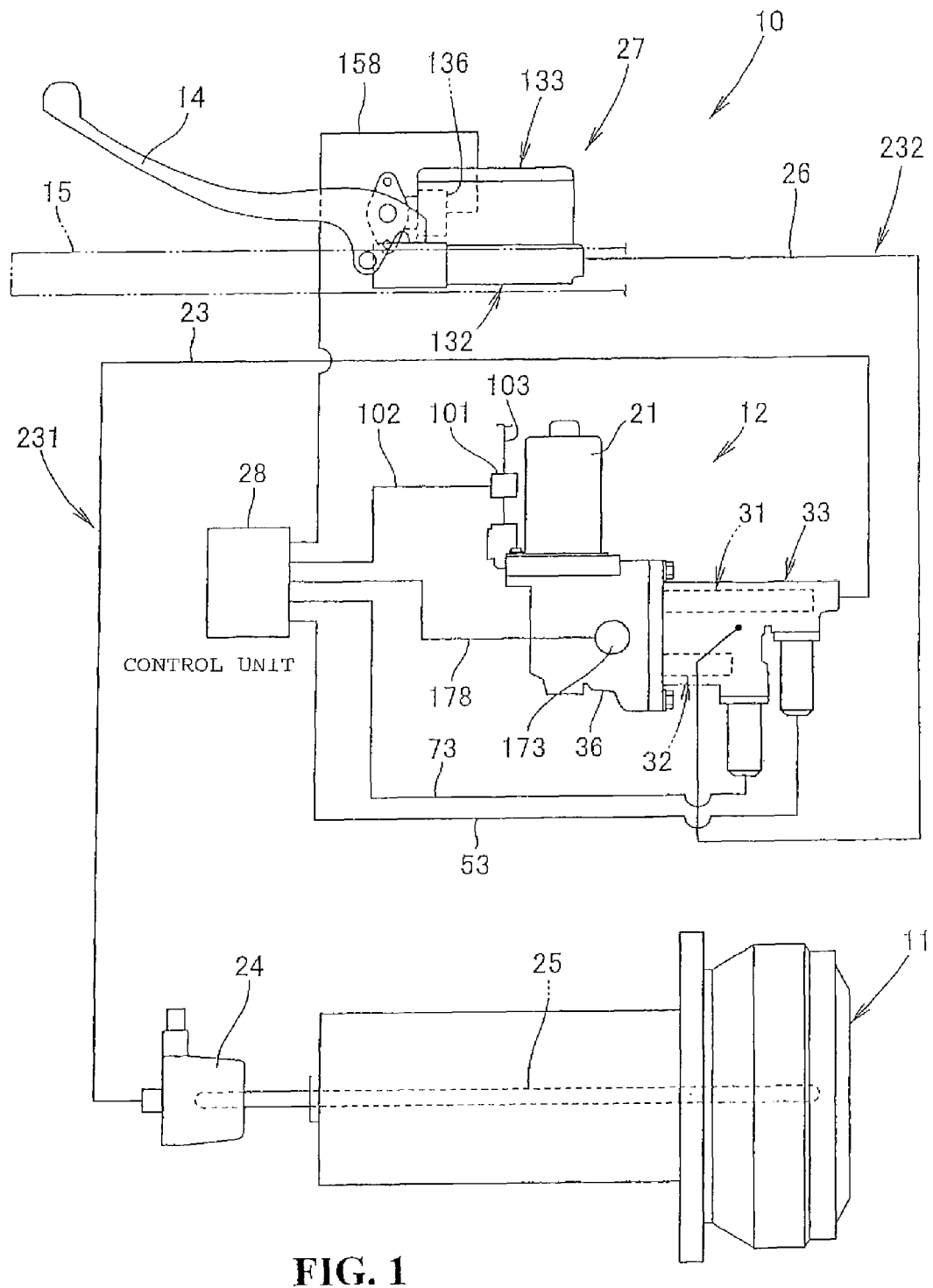
FIG. 1 is a system diagram showing a clutch hydraulic system according to the present invention.

FIG. 1 is a system diagram of a clutch hydraulic mechanism for a vehicle according to the present invention. The clutch hydraulic mechanism 10 is a system which, at the time of making/breaking transmission of motive power between an engine and a transmission provided on a saddle ride type vehicle such as a motorcycle and an all-terrain vehicle by a clutch 11, can normally detect the force of a step on a gear change pedal, vehicle speed, etc. and automatically disconnect or connect the clutch 11 through, for example, an actuator unit 12 at the time of gear change, and can also manually disconnect or connect the clutch 11 through a clutch lever 14, as required.

The clutch hydraulic mechanism 10 includes the actuator unit 12 provided with an electric motor 21 as a drive source for generating hydraulic pressure, a first release cylinder 24 connected to the actuator unit 12 through a first hydraulic oil pipe 23, a push rod 25 disposed between the first release cylinder 24 and the clutch 11, a lever-operated part 27 provided on a bar handle 15 of the motorcycle and connected to the actuator unit 12 through a second hydraulic oil pipe 26 and a control unit 28 for controlling the operation of the electric motor 21 of the actuator unit 12 on the basis of input signals from various sensors (to be detailed later) provided at the actuator unit 12 and the lever-operated part 27 and such signals as gear position of a transmission, engine speed, vehicle speed, throttle opening, etc. obtained from an engine control unit (not shown).

In the clutch hydraulic mechanism 10, the electric motor 21 of the actuator unit 12 is operated to generate hydraulic pressure, and the hydraulic pressure is transmitted to the first release cylinder 24 so as to automatically disconnect the clutch 11 through the push rod 25. Alternatively, the clutch lever 14 is operated to generate hydraulic pressure in the lever-operated part 27, and the hydraulic pressure is transmitted sequentially through a second hydraulic oil pipe 26, the actuator unit 12 and the first hydraulic oil pipe 23 to the first release cylinder 24, thereby disconnecting the clutch 11 through the push rod 25 on a manual basis. In order to connect the clutch 11, the hydraulic pressure is lowered.

Figure 2:
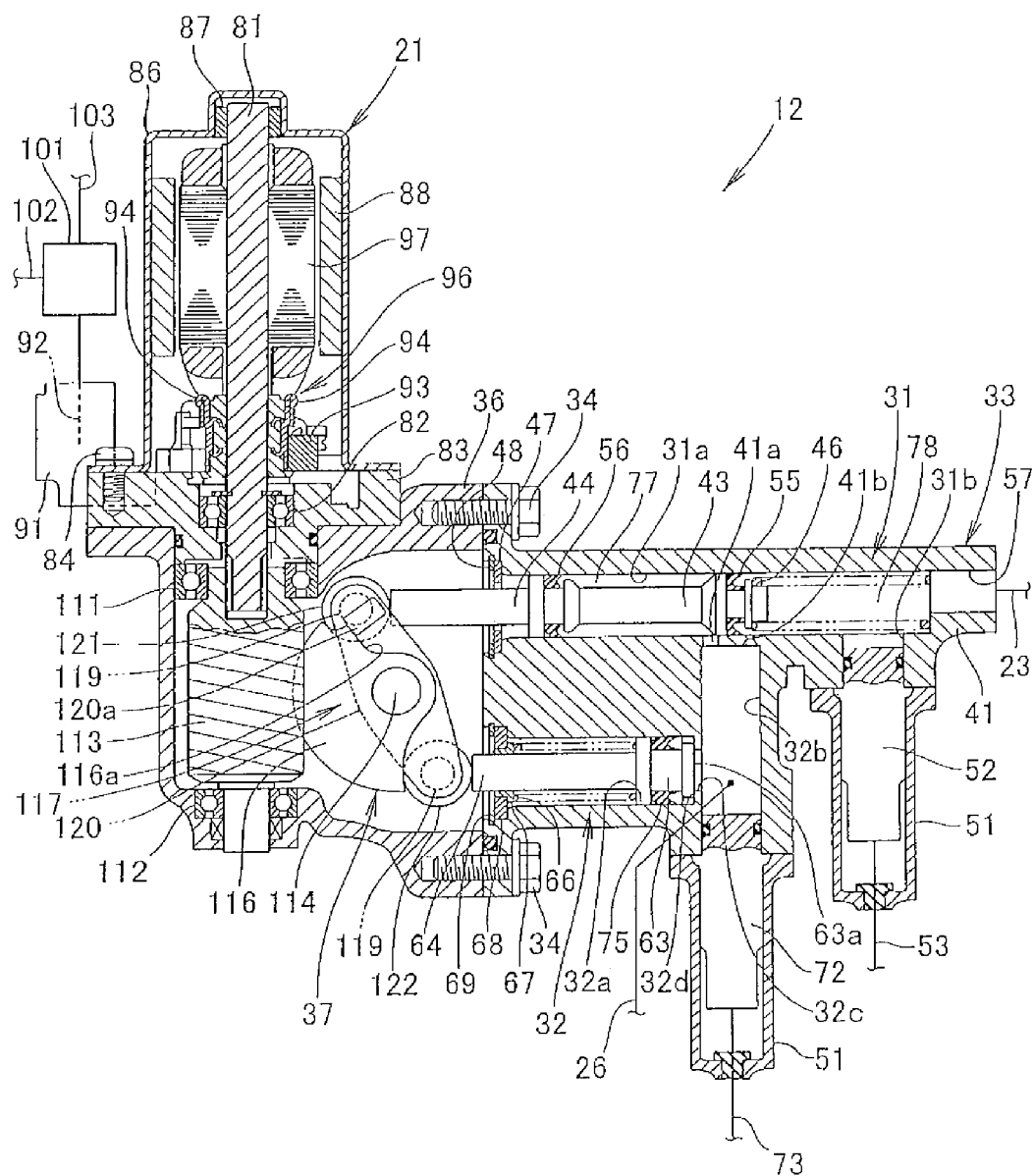
FIG. 2 is an illustration of an actuator unit in the clutch hydraulic system according to the present invention.

FIG. 2 is an illustration of the actuator unit in the clutch hydraulic mechanism according to the present invention. The actuator unit 12 includes a cylinder formation part 33 provided with a first master cylinder 31 and a second release cylinder 32, a gear case 36 attached to a side surface of the cylinder formation part 33 by a plurality of bolts 34; the electric motor 21 attached to an upper part of the gear case 36 and a pushing force transmitting part 37 by which a drive force of the electric motor 21 is transmitted to the first master cylinder 31 or by which a pushing force due to the hydraulic pressure generated in the second release cylinder 32 is transmitted to the first master cylinder 31.

The cylinder formation part 33 has a cylinder block 41 provided therein with a first cylinder bore 31a of the first master cylinder 31, and with a second cylinder bore 32a of the second release cylinder 32 provided on the lower side of and in parallel to the first master cylinder 31.

The first master cylinder 31 includes the cylinder block 41 made by casting (for example, die-casting) an aluminum alloy, the first cylinder bore 31a, a piston 43 movably inserted in the first cylinder bore 31a, a rod 44 formed integrally with the piston 43, a compression coil spring 46 provided between one end of the piston 43 and one end part of the first cylinder bore 31a for the purpose of pushing out the piston 43 and the rod 44 to the side of the pushing force transmitting part 37 and a washer 47 and a stop ring 48 provided at the other end part of the first cylinder bore 31a for the purpose of preventing the piston 43 from coming out of the first cylinder bore 31a.

The first cylinder bore 31a and the second cylinder bore 32a in the cylinder block 41 are machined from the same direction. More specifically, from the left side in FIG. 2. This makes it possible to enhance the machining accuracy of each of the first cylinder bore 31a and the second cylinder bore 32a, and to enhance the positional accuracy (inclusive of parallelism) of the first cylinder bore 31a and the second cylinder bore 32a.

The pressure of the oil in the first cylinder 31a (namely, the pressure of the oil in the first hydraulic oil pipe 23) is detected by a pressure sensor 52 attached to a first communicating hole 31b, which communicates with the first cylinder bore 31a from the lower side, from the lower side by a fixture 51. In addition, a wire 53 is provided for sending hydraulic pressure signal from the pressure sensor 52 to the control unit 28 (see FIG. 1).

In FIG. 2, a rubber-made primary cup 55 and a rubber-made secondary cup 56 are attached to the piston 43 for sealing the gap between the piston 43 and the first cylinder bore 31a. A pipe connection port 57 is provided at one end part of the first cylinder bore 31a for connecting the first hydraulic oil pipe 23.

The second release cylinder 32 includes the cylinder block 41, a piston 63 movably inserted in the second cylinder bore 32a, a rod 64 formed integrally with the piston 63, a compression coil spring 66 abutting on the piston 63 at one end thereof for pushing out the piston 63 and the rod 64 to the side opposite to the pushing force transmitting part 37, a spring receiving member 67 for receiving the other end of the compression coil spring 66 and a washer 68 and a stop ring 69 provided in the second cylinder bore 32a for the purpose of supporting the spring receiving part 67.

The pressure of the oil in the second cylinder bore 32a (namely, the pressure of the oil in the second hydraulic oil pipe 26) is detected by a pressure sensor 72 attached to a second communicating hole 32b, which communicates with the second cylinder bore 32a from a lateral side through a communication port 32c, from the lower side by a fixture 51. In addition, a wire 73 is provided for sending hydraulic pressure signal from the pressure sensor 72 to the control unit 28.

In FIG. 2, a stepped part 32d is formed between the second cylinder bore 32a and the communication port 32c, and an end face 63a of the piston 63 is pressed against the stepped part 32d by the compression coil spring 66. A rubber-made cup 75 is attached to the piston 63 for the purpose of sealing a gap between the piston 63 and the second cylinder bore 32a.

The second communicating hole 32b communicates with the first cylinder bore 31a through a large diameter hole 41a and a small diameter hole 41b.

The large diameter hole 41a and the small diameter hole 41b arc holes, which are formed on the lower side of the first cylinder bore 31a and by which the oil in a reservoir tank (detailed later referring to FIG. 3), and are provided at the lever-operated part 27 (see FIG. 1) wherein oil is supplied into both the first master cylinder 31 and the second release cylinder 32. This ensures that, even when the amount of the oil in all the hydraulic oil passages in the clutch hydraulic mechanism 10 (see FIG. 1) is varied due to temperature variations, abrasion of frictional members in the clutch 11 (see FIG. 1) or the like, the oil in the reservoir tank is supplied or the oil is recovered from the hydraulic oil passages into the reservoir tank.

The two holes consisting of the large diameter hole 41a and the small diameter hole 41b are formed so as to ensure that both of the two oil chambers 77, 78 formed respectively on both sides of the primary cup 55 in the first cylinder bore 31 a communicate with the second communication hole 32b to enable a flow-in/flow-out of the oil.

In the actuator unit 12, specifically, in the cylinder formation part 33 in the present embodiment, the primary cup 55 of the first master cylinder 31 is disposed on the first hydraulic oil pipe 23 side relative to an end part of the second release cylinder 32 (more specifically, the second cylinder bore 32a). Therefore, by disposing the second communicating hole 32b adjacent to the second cylinder bore 32a, the large diameter hole 41a and the small diameter hole 41b for making communication between the second communicating hole 32b and the first cylinder hole 31a can each be formed in a simple shape. More specifically, a straight and short round hole shape. Accordingly, it is possible to save space and to reduce machining cost.

The electric motor 21 includes a rotary shaft 81 extending vertically, a base part 83 attached to an upper part of the gear case 36 by a plurality of bolts so as to rotatably support the rotary shaft 81 through a bearing 82, a motor housing 86 attached to the base part 83 by a plurality of small screws 84, a radial bearing (sliding bearing) 87 attached to an end part of the motor housing 86 so as to support the rotary shaft 81, a stator 88 comprised of a permanent magnet attached to the inside surface of the motor housing 86, an electric power supplying connector 91 attached to the base part 83, a brush 93 connected to connection terminals 92, 92 (only symbol 92 on one side is shown) of the electric power supplying connector 91 through wires (not shown), a commutator 96 comprised of a plurality of commutator pieces 94 attached to the rotary shaft 81 for the purpose of passing a current from the brush 93 and a rotor 97 comprised of a core and a coil which are attached to the rotary shaft 81 so as to face the stator 88.

As illustrated in FIG. 2, a motor driving part 101 is provided for driving the electric motor 21 and is connected to the control unit 28 through a wire 102. Based on a control signal from the control unit 28, passing of a current to the electric motor 21 through an electric power supplying wire 103 connected to the electric power supplying connector 91 is controlled, whereby driving (normal rotation or reverse rotation) and stopping of the electric motor 21 are performed.

The pushing force transmitting part 37 includes a worm 113 which is spline connected to the lower end of the rotary shaft 81 of the electric motor 21 and which is rotatably supported on the gear case 36 through bearings 111, 112, a support shaft 114 rotatably mounted to the gear case 36, a sector-shaped worm wheel 116 attached to the support shaft 114 and meshed with the worm 113 and a seesaw member 117 rotatably mounted to the support shaft 114.

The seesaw member 117 includes a seesaw body 120 rotatably supported on the support shaft 114 and a first roller 121 and a second roller 122 which are rotatably supported respectively on both ends of the seesaw member 120 through support shafts 119.

The seesaw member 120 is provided at its side surface with a protrusion 120a abutting on an end surface 116a of the worm wheel 116.

The first roller 121 is a member against which the rod 44 of the first master cylinder 31 is pressed by an elastic force of the compression coil spring 46.

The second roller 122 is a member which can abut on the tip of the rod 64 of the second release cylinder 32. When the second roller 122 is pressed against the rod member 64, the seesaw member 117 is rotated clockwise about the support shaft 114, and the first roller 121 pushes out the rod 44 to the right in FIG. 2.

The worm 113 of the pushing force transmitting part 37 is disposed on the lower side of the electric motor 21. This ensures that, when abraded powder is generated in the meshing area between the worm 113 and the worm wheel 116, the abraded powder can be dropped to the lower side, so that there is no fear that the abraded powder would affect the operation of the electric motor 21.

In addition, since the brush 93 and the commutator 96 of the electric motor 21 are disposed below the stator 88 and the rotor 97, abraded powder generated from the brush 93 can be dropped to the lower side, in the same manner as the above-mentioned abraded powder.

Figure 3:
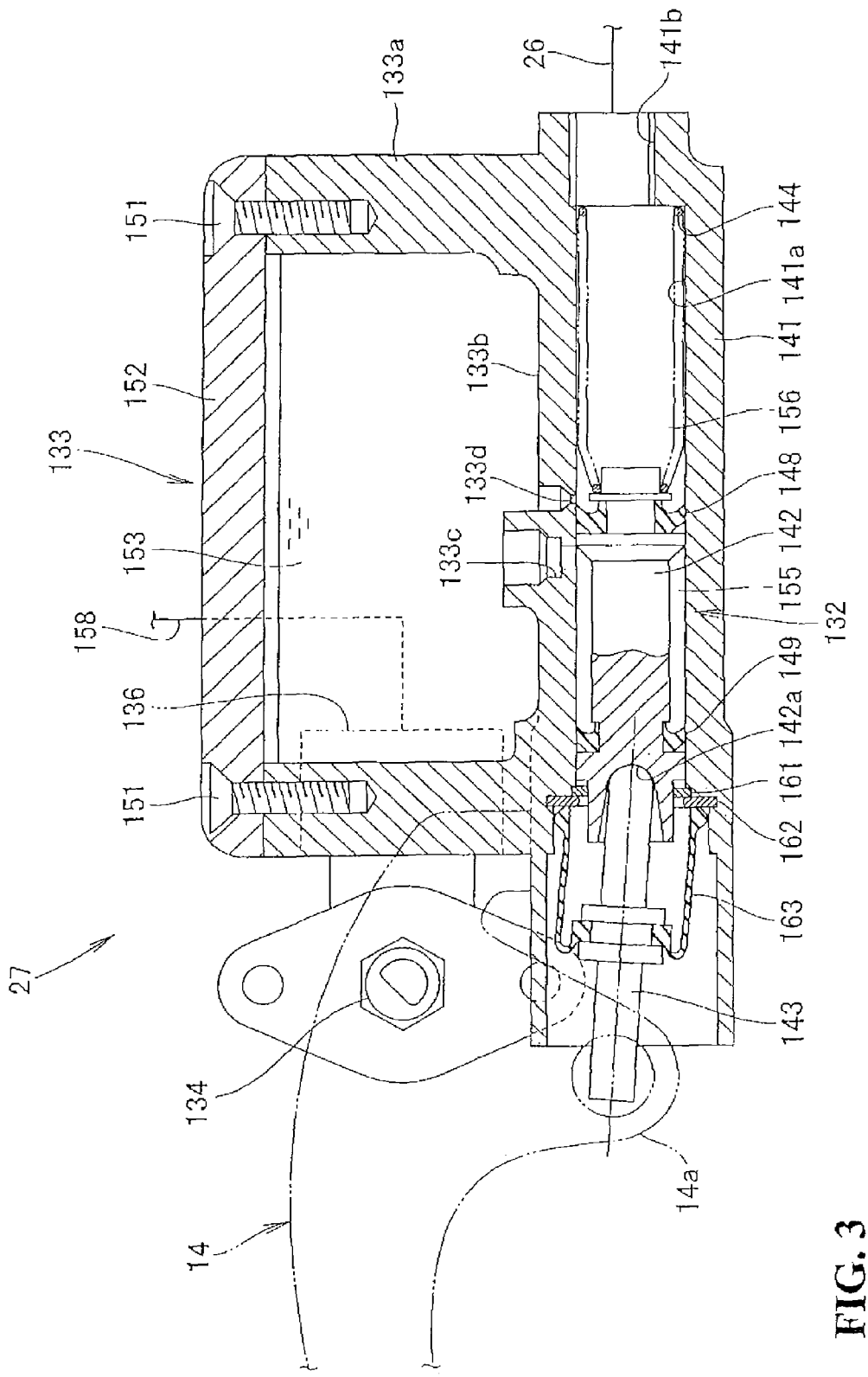
FIG. 3 is a sectional view showing a lever-operated part of the clutch hydraulic system according to the present invention.

FIG. 3 is a sectional view of the lever-operated part of the clutch hydraulic system according to the present invention. The lever-operated part 27 includes the clutch lever 14, a second master cylinder 132 for generating hydraulic pressure in response to an operation of the clutch lever 14, a reservoir tank 133 provided integrally with the second master cylinder 132 and a lever rotating angle sensor 136 attached to a swing shaft 134 of the clutch lever 14 for the purpose of detecting the swing angle of the clutch lever 14.

The second master cylinder 132 includes a tubular cylinder body 141, a piston 142 movably inserted in a cylinder bore 141a provided in the cylinder body 141, a rod 143 having its one end connected to an arm part 14a of the clutch lever 14 and its other end inserted in a recess 142a in the piston 142 for the purpose of pressing the piston 142 and a spring 144 for pushing out the piston 142 to the side of the rod 143. The second hydraulic oil pipe 26 is connected to a pipe connection port 141b provided at an end part of the cylinder body 141. Incidentally a rubber-made primary cup 148 and a rubber-made secondary cup 149 are attached to the piston 142 for the purpose of sealing a gap between the piston 142 and the cylinder bore 141a.

The reservoir tank 133 includes a body part 133a formed integrally with the cylinder body 141 and a cover part 152 attached by a plurality of small screws 151 for closing an upper aperture of the body part 133a. The reservoir tank 133 holds the oil 153 contained therein. As shown in FIG. 1, the reservoir tank 133 is attached to the bar handle 15, and is located at the highest position of the body of the vehicle (the position is also a position where it is easy to check the amount of the oil 153 and to supply the oil).

The body part 133a is provided in a bottom part 133b thereof with a large diameter hole 133c and a small diameter hole 133d which communicate with the cylinder bore 141a of the second master cylinder 132. Therefore, even when the amount of the oil in all the hydraulic oil passages (namely, a first hydraulic oil passage 231 and a second hydraulic oil passage 232 (see FIG. 1) which will be described later) in the clutch hydraulic system 10 (see FIG. 1) is varied due to temperature variations, abrasion of frictional members in the clutch 11 (see FIG. 1) or the like, the oil 153 in the reservoir tank 133 is supplied, or the oil 153 is recovered from the hydraulic oil passages into the reservoir tank 133.

The two holes consisting of the large diameter hole 133c and the small diameter hole 133d are provided for supplying the oil 153 into both of the two oil chambers 155 and 156 formed respectively on both sides of a primary cup 148 inside the cylinder bore 141a or for recovering the oil 153 from both of the oil chambers 155, 156.

The lever rotating angle sensor 136 is connected to the control unit 28 (see FIG. 1) through a wire 158.

A washer 161 is provided for preventing the piston 142 from coming out of the cylinder bore 141a. A stop ring 162 is provided for fixing the washer 161 to the cylinder body 141. A dust cover 163 is provided.

As has been shown in FIGS. 1 to 3, the present invention provides the clutch hydraulic system 10 for a vehicle, including the first clutch hydraulic oil passage as a clutch hydraulic oil passage including the first master cylinder 31 as a clutch master cylinder for generating hydraulic pressure by motive power given thereto, and the first release cylinder 24 as a clutch release cylinder to which hydraulic pressure is transmitted from the first master cylinder 31 through the first hydraulic oil pipe 23 as a first oil pipe and which disconnects the clutch 11 and the second hydraulic oil passage 232 as a manual hydraulic oil passage including the second master cylinder 132 as a manual master cylinder operated manually to generate hydraulic pressure, and the second release cylinder 32 as a manual release cylinder operated by hydraulic pressure transmitted from the second master cylinder 132 through the second hydraulic oil pipe 26 as a second oil pipe to thereby generate hydraulic pressure in the first master cylinder 31, wherein the seesaw member 117 as a power transmitting member for transmitting motive power is provided between the second release cylinder 32 and the first master cylinder 31, the first master cylinder 31 and the second hydraulic oil pipe 26 communicate with each other through the large diameter hole 41a and the small diameter hole 41b provided as communicating passages, and the reservoir tank 133 reserving the oil for controlling the amounts of the oil in the first hydraulic oil passage 231 and the second hydraulic oil passage 232 is connected to the second master cylinder 132, so that the amount of the oil in the first hydraulic oil passage 231 can be controlled by the oil in the reservoir tank 133, in the same manner as the amount of the oil in the second hydraulic oil passage 232.

Therefore, the single reservoir tank 133 suffices for both the first hydraulic oil passage 231 and the second hydraulic oil passage 232, so that it is possible to easily mount the single reservoir tank 133 in a space around the bar handle 15, to increase the degree of freedom in designing the clutch hydraulic system 10 for a vehicle, and to reduce the cost of the clutch hydraulic system 10 for a vehicle. Further, the two systems consisting of the system for disconnecting the clutch 11 by given motive power and the system for disconnecting the clutch manually can be operated independently.

Furthermore, since both the first hydraulic oil passage 231 and the second hydraulic oil passage 232 can be deaerated by only one deaeration operation, maintainability can be enhanced.

As shown in FIGS. 1 and 3, the second master cylinder 132 and the reservoir tank 133 are mounted to the bar handle 15 provided in the vehicle, and the second master cylinder 132 is operated by the clutch lever 14 provided on the bar handle 15. Therefore, by providing the bar handle 15 with the single reservoir tank 133, it is easy to check the amount of the oil 153 in the reservoir tank 133 and to supply the oil 153.

In addition, since the single reservoir tank 133 is attached to the bar handle 15, there is no need to secure a space in which to provide other reservoir tank 133. Further, it is possible to increase the degree of freedom in designing the clutch hydraulic system 10 for the vehicle.

Figure 4:
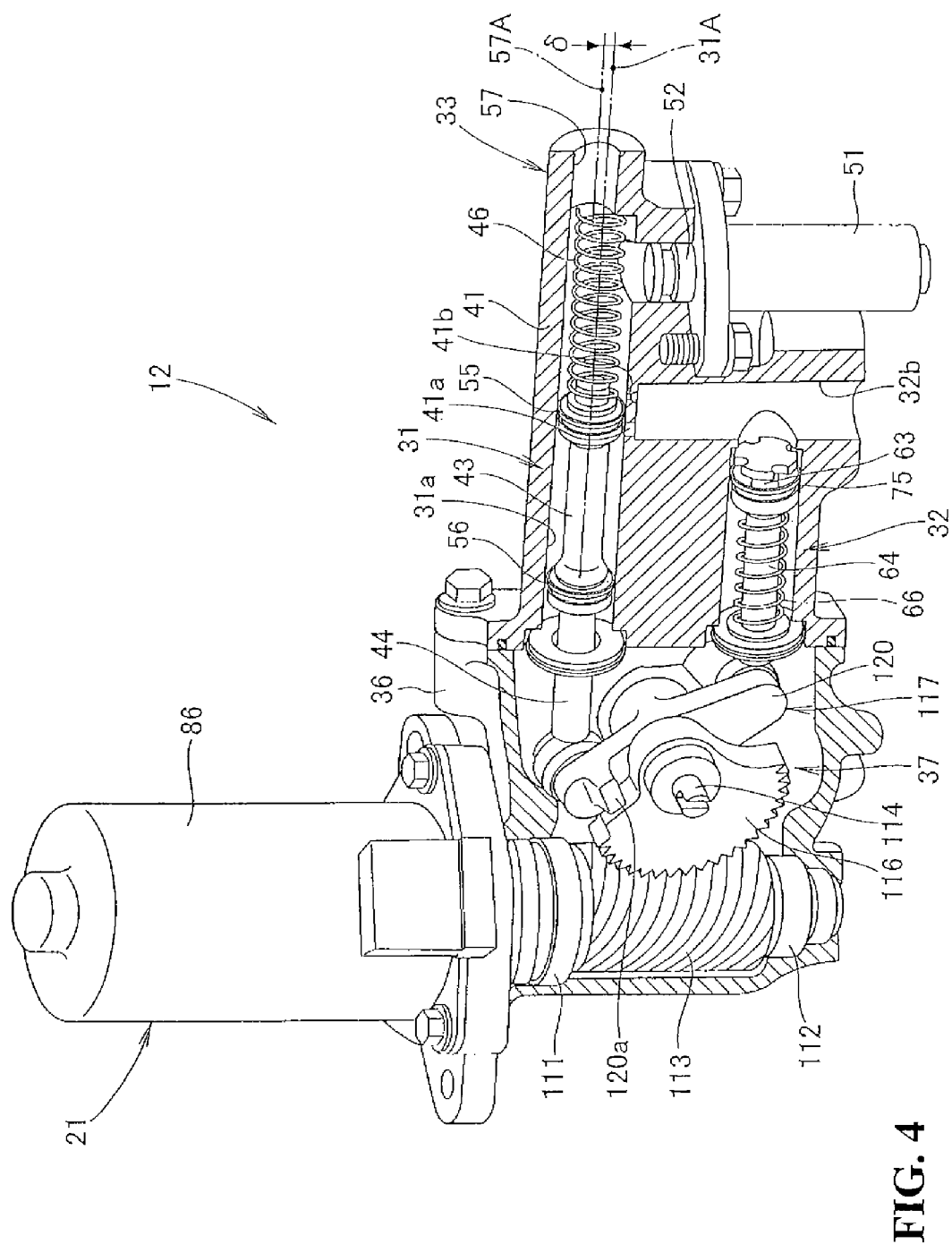
FIG. 4 is a first perspective view of the actuator unit according to the present invention.

FIG. 4 is a first perspective view of the actuator unit according to the present invention. The actuator unit 12 includes the first master cylinder 31 and the second release cylinder 32 integrally provided as upper and lower two cylinders in the cylinder block 41. The cylinder block 41 is provided therein with the electric motor 21 and the pushing force transmitting part 37 by which the drive force of the electric motor 21 is transmitted to the first master cylinder 31 or by which a pushing force generated by the second release cylinder 32 is transmitted to the first master cylinder 31. This configuration ensures that the actuator unit 12 is made compact and small in size, so that the actuator unit 12 can be easily disposed in a narrow body space in the motorcycle.

A pipe connection port 57 for connecting the first hydraulic oil pipe 23 (see FIG. 2) to the first master cylinder 31 has an inner diameter smaller than the inner diameter of the first cylinder bore 31a. Further, the axis 57A of the pipe connection port 57 is set off by a distance δ upwards from the axis 31A of the first cylinder bore 31a, and the actuator unit 12 is mounted to the vehicle body so that the pipe connection port 57 is inclined by about 2 to 5 degrees upward from a horizontal plane.

This ensures that an uppermost part of the inner peripheral surface of the pipe connection port 57 is horizontally continuous with an uppermost part of the inner peripheral surface of the first cylinder bore 31a, or the uppermost part of the inner peripheral surface of the pipe connection port 57 is above the uppermost part of the inner peripheral surface of the first cylinder bore 31a. Further, the pipe connection port 57 is so inclined that the uppermost part of the inner peripheral surface thereof is above the uppermost part of the inner peripheral surface of the first cylinder bore 31a. Therefore, air having mixed into the oil in the first cylinder bore 31a can be easily released through the pipe connection port 57 into the first hydraulic oil pipe 23 and a deaeration operation can be efficiently performed by use of a deaeration plug 186 in the first release cylinder 24 (to be described referring to FIG. 7) connected to the first hydraulic oil pipe 23.

Figure 5:
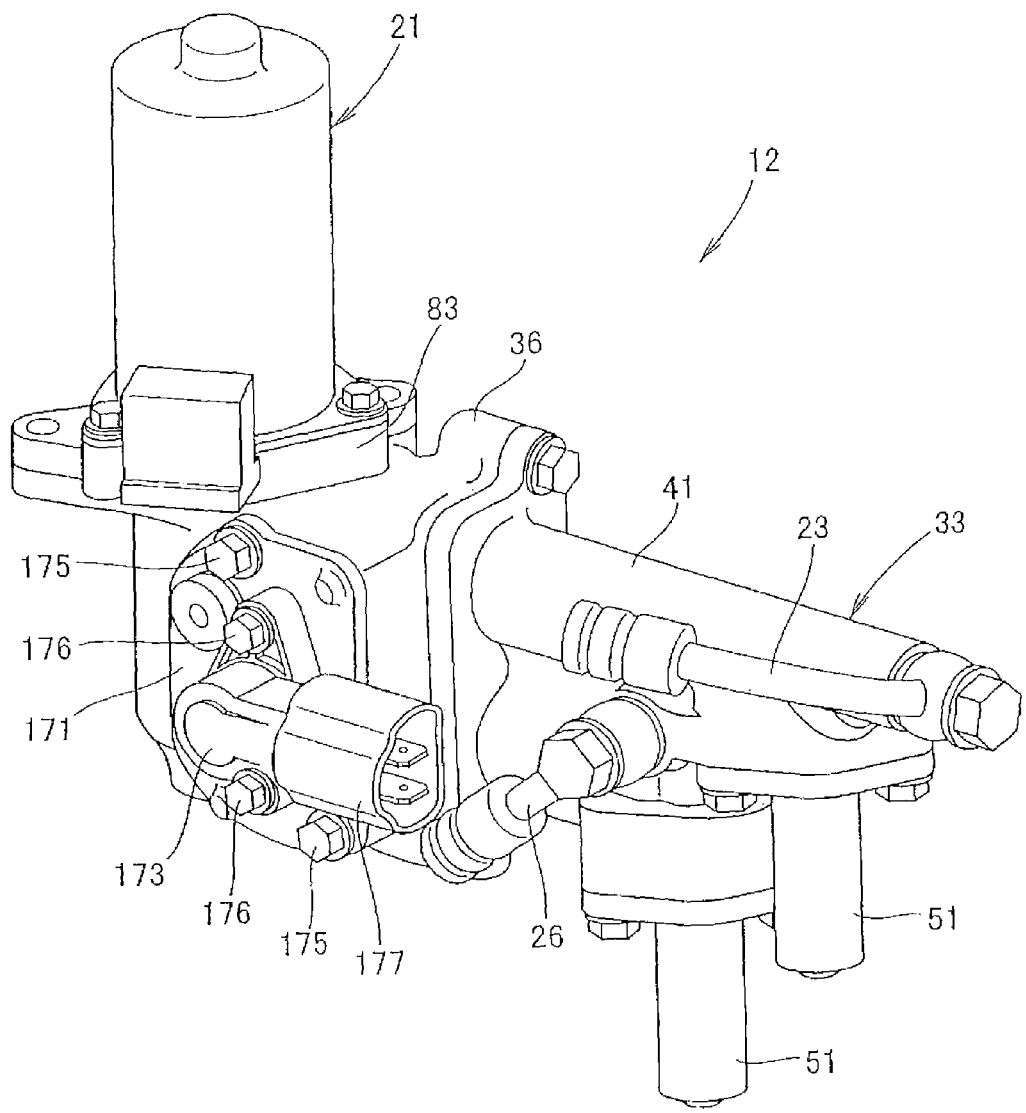
FIG. 5 is a second perspective view of the actuator unit according to the present invention.

FIG. 5 is a second perspective view of the actuator unit according to the present invention. The gear case 36 of the actuator unit 12 is provided with an aperture (not shown) in a side surface thereof, and is provided with a cover member 171 which closes the aperture and which rotatably supports one end of the support shaft 114 (see FIG. 2) of the pushing force transmitting part 37 (see FIG. 2). A worm wheel rotating angle sensor 173 for detecting the rotating angle of the worm wheel 116 (see FIG. 2) is attached to the cover member 171 through the support shaft 114.

A plurality of bolts 175 are provided for attaching the cover member 171 to the gear case 36. A plurality bolts 176 are provided for attaching the worm wheel rotating angle sensor 173 to the cover member 171. A connector 177 is provided by which an output signal from the worm wheel rotating angle sensor 173 is connected to the control unit 28 (see FIG. 1) side through a wire 178 (see FIG. 1).

Figure 6:
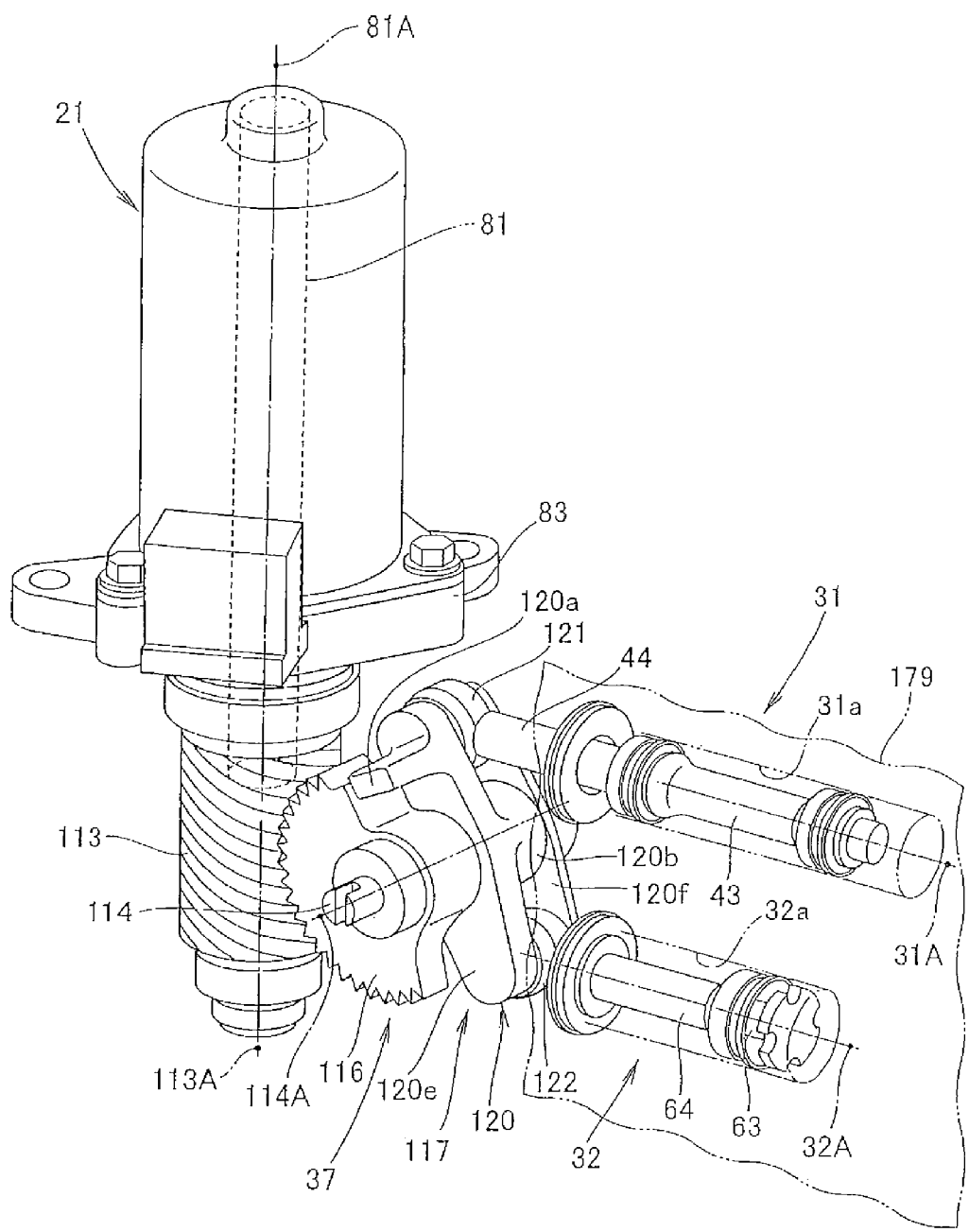
FIG. 6 is a perspective view showing a part of the actuator unit according to the present invention.

FIG. 6 is a perspective view of a part of the actuator unit according to the present invention. The axis of the piston 43 in the first master cylinder 31, i.e., the axis 31A of the first cylinder bore 31a and the axis of the piston 63 in the second release cylinder 32, i.e., the axis 32A of the second cylinder bore 32a are present in the same plane and are parallel to each other. In addition, the axis 31A and the axis 32A are orthogonal to the axis 114A of the support shaft 114 of the pushing force transmitting pat 37.

With the axis 31A and the axis 32A disposed in the same plane 179, the cylinder block 41 (see FIG. 2) can be made thin. In addition, with the axis 31A and the axis 32A set to be parallel to each other, it is possible to easily machine the first cylinder bore 31a and the second cylinder bore 32a, and to reduce the height of the cylinder block 41. Further, with the axis 31A and the axis 32A set orthogonal to the axis 114A, the plane 179 is made to be parallel to respective loci of rotation of the worm wheel 116 and the seesaw member 117, which makes it possible to render the pushing force transmitting part 37 thinner and to save space.

In addition, preferably, the axis 81A of the rotary shaft 81 of the electric motor 21 and the axis 113A of the worm 113 coaxial with the axis 81A are parallel to the plane 179 passing through the axis 31A and the axis 32A. As a result of the foregoing, the axis 114A is orthogonal to the axes 81A and 113A.

With the plane 179 thus set in parallel to the axis 81A and the axis 113A, the pushing force transmitting part 37 can be made thinner. Thus, a space saving can be achieved.

Further, with the axis 114A set orthogonal to the axes 81A and 113A, the actuator unit 12 (see FIG. 5) as a whole can be made thin. Thus, a space saving can be achieved, and mountability of the actuator unit 12 onto the vehicle can be enhanced. Furthermore, a high reduction ratio worm gear pair including the worm 113 and the worm wheel 116 can be easily adopted, and the pushing force transmitting part 37 can be configured to be simple, so that space saving and cost reduction can be achieved.

A seesaw body 120 of the seesaw member 117 includes a main seesaw member 120e having the protrusion 120a and a boss part 120b formed integrally, and a sub seesaw body 120f disposed adjacent to the main seesaw member 120e. The sub seesaw member 120f is joined to the main seesaw member 120e by two support shafts 119, 119 (see FIG. 2) and the boss part 120b.

Figure 7:
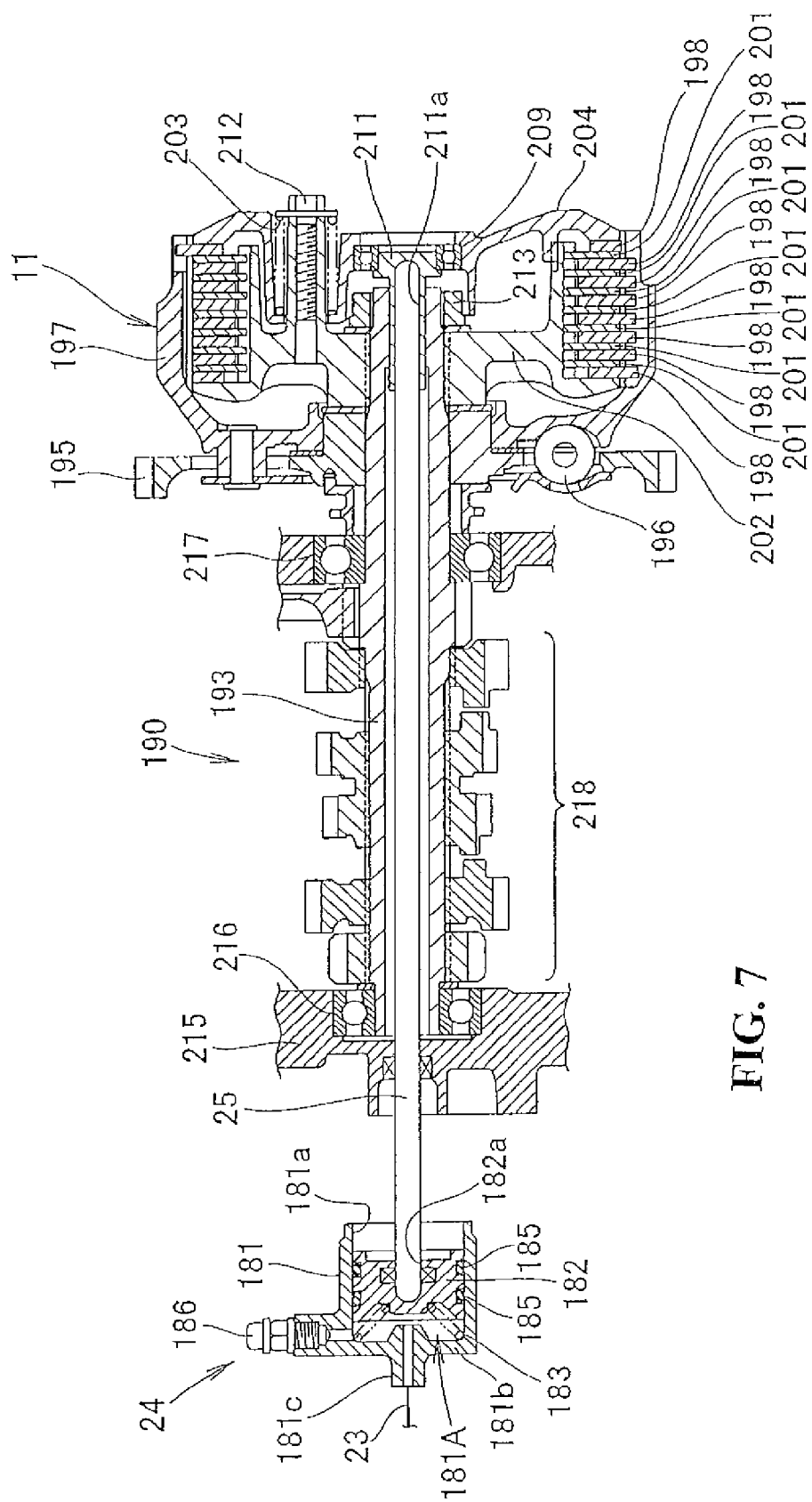
FIG. 7 is a sectional view for illustrating a first release cylinder and a clutch according to the present invention.

FIG. 7 is a sectional view for illustrating the first release cylinder and the clutch according to the present invention. The first release cylinder 24 includes a bottomed tubular cylinder body 181, a piston 182 movably inserted in a cylinder bore 181a formed in the cylinder body 181 and a spring 183 which is disposed between the piston 182 and a bottom wall 181b of the cylinder body 181 and which pushes out the piston 182 to the side of the push rod 25. In addition, an oil chamber 181A and a pipe connection port 181c are provided in the bottom wall 181b of the cylinder body 181 for the purpose of connecting the first hydraulic oil pipe 23. An O-ring 185, 185 is mounted to the piston 182 for the purpose of sealing a gap between the cylinder bore 181a and the piston 182. A deaeration plug 186 is provided for releasing air having mixed into the oil inside the cylinder body 181.

The piston 182 is provided with a rod insertion hole 182a in which to insert one end of the push rod 25.

The clutch 11 is of the multiple disk type, including a large driven gear 195 which is rotatably mounted to a main shaft 193 constituting a transmission 190 and which is meshed with a gear on the crankshaft side, a drive member 197 attached to the large driven gear 195 through a coil spring 196, clutch disks 198 as a plurality of frictional disks which are movable in the axial direction of the main shaft 193 and which are engaged with the inner peripheral surface of the drive member 197 in a rotating direction, a plurality of clutch plates 201 alternately overlapped with the clutch disks 198, a driven member 202 which is spline connected to the main shaft 193 and on which the inner peripheral surfaces of the clutch plates 201 are movable in the axial direction of the main shaft 193 and are engaged in the rotating direction, a pushing member 204 which is attached to the driven member 202 through a plurality of coil springs 203 and which pushes the driven member 202 through the pluralities of clutch disks 198 and clutch plates 201 and an input member 211 disposed on the pushing member 204 through a bearing 209, movably mounted to an end part of the main shaft 193 and provided with a rod insertion hole 211a in which to insert the other end part of the push rod 25.

A plurality of bolts 212 are provided wherein the coil spring 203 for pressing the pushing member 204 against the driven member 202 is attached to the driven member 202. A nut 213 is provided for attaching the driven member 202 to the main shaft 193.

The transmission 190 has a configuration in which the main shaft 193 is rotatably mounted on a housing 215 through bearings 216, 217, and a counter shaft (not shown) is rotatably mounted on the housing 215 through a pair of bearings.

A drive gear train 218 includes a plurality of drive gears is spline connected onto the main shaft 193 so as to be movable in the axial direction, a driven gear train comprised of a plurality of driven gears is spline connected onto the counter shaft, the gears of the driven gear train are meshed with the gears of the drive gears 218, and a gear for power transmission is selected by a transmission mechanism (not shown).

As illustrated in FIG. 1, the first master cylinder 31, the first hydraulic oil pipe 23 and the first release cylinder 24 are component parts constituting the first hydraulic oil passage 231 for connecting/disconnecting the clutch 11, whereas the second master cylinder 132, the second hydraulic oil pipe 26 and the second release cylinder 32 are component parts constituting the second hydraulic oil passage 232.

The operation of the clutch hydraulic system 10 as set forth above will be described below.

Figure 8:
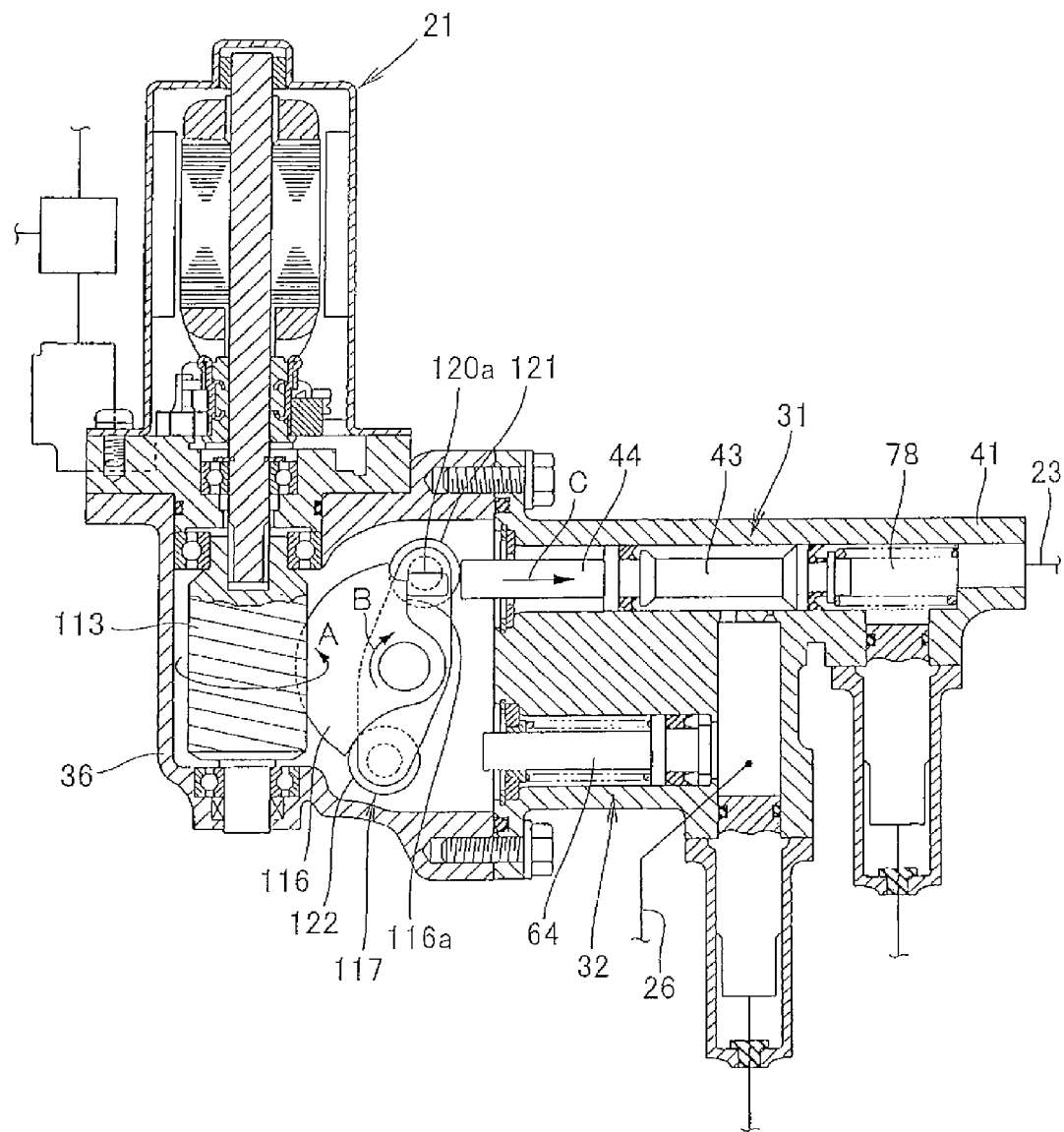
FIG. 8 is a first operation view showing an operation of the clutch hydraulic system according to the present invention.

FIG. 8 is a first operational view showing an operation of the clutch hydraulic system according to the present invention.

In FIG. 8, when a current is supplied to the electric motor 21 starting from the condition of FIG. 2, the worm 113 is rotated in the direction of arrow A, whereby the worm wheel 116 is rotated in the direction of arrow B. In this instance, the end surface 116a of the worm wheel 116 pushes the protrusion 120a of the seesaw member 117, so that the seesaw member 117 is also rotated together with the worm wheel 116, and the first roller 121 of the seesaw member 117 pushes out the rod 44 of the first master cylinder 31 in the direction of arrow C.

In this way, the piston 43 is moved together with the rod 44, to raise the hydraulic pressure inside the oil chamber 78. This hydraulic pressure is transmitted through the first hydraulic oil pipe 23 to the oil chamber 181A in the cylinder body 181 of the first release cylinder 24 shown in FIG. 7, to raise the hydraulic pressure inside the oil chamber 181A, so that the piston 182 pushes the push rod 25, and the push rod 25 is thereby moved toward the side of the clutch 11.

As a result, through the function of the bearing 209, the pushing member 204 is separated from the clutch disk 198 against the elastic force of the coil spring 203, the pushing force for pressing the clutch disks 198 and the clutch plates 201 against each other is substantially eliminated, whereby the clutch 11 is disconnected, i.e., no motive power is transmitted from the drive member 197 to the driven member 202.

As illustrated in FIG. 8, the second roller 122 of the seesaw member 117 is spaced away from the rod 64 of the second release cylinder 32, so that the operation of the electric motor 21 does not affect the clutch lever 14 (see FIG. 1) side (i.e., the second hydraulic oil passage 232).

Figure 9:
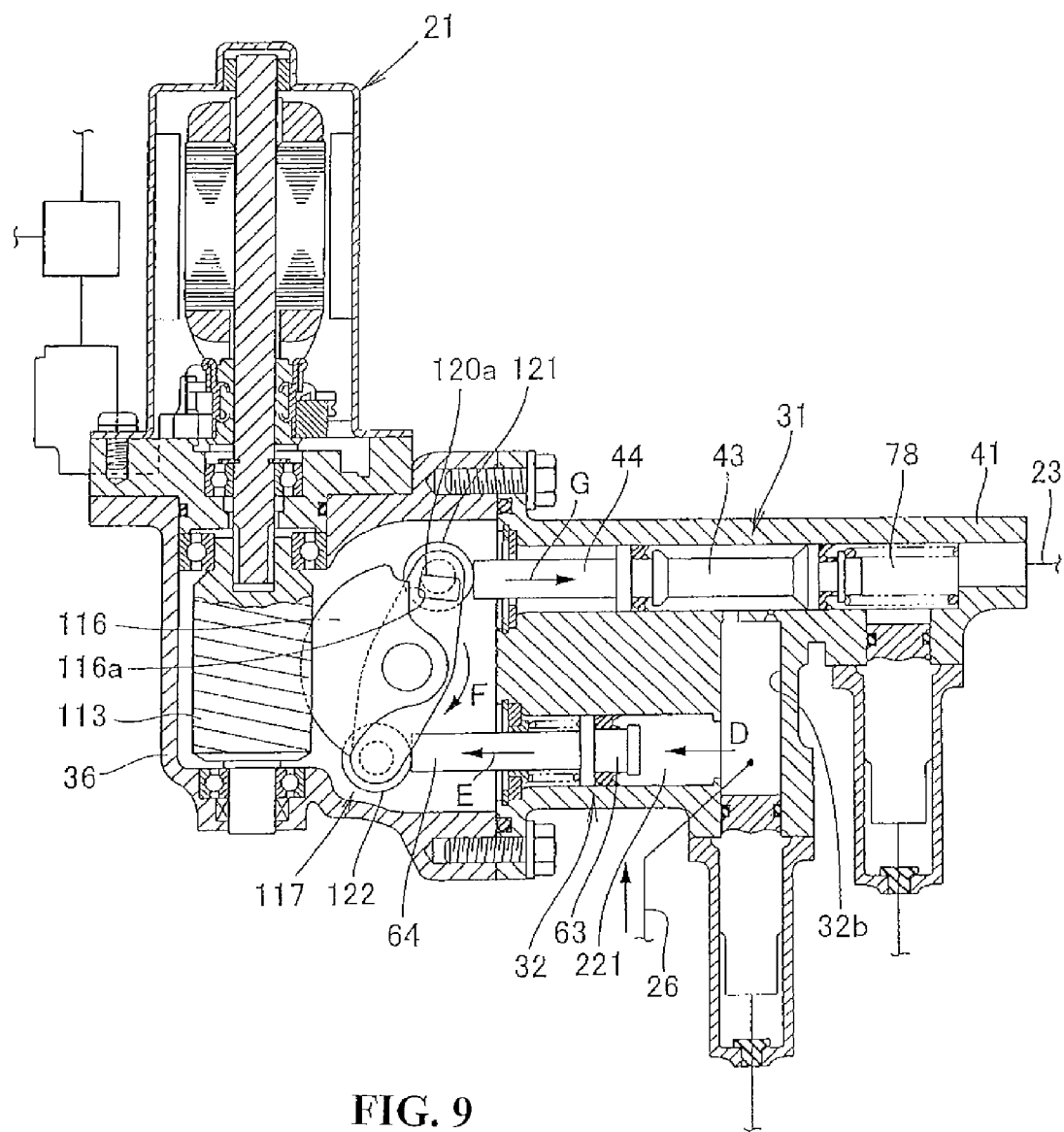
FIG. 9 is a second operation view showing an operation of the clutch hydraulic system according to the present invention.

FIG. 9 is a second operational view showing an operation of the clutch hydraulic system according to the present invention.

For example, when the clutch lever 14 in FIG. 3 is operated to move the piston 142 in the second master cylinder 132 to the right in FIG. 3 to thereby raise the hydraulic pressure inside the oil chamber 156, starting from the condition where the electric motor 21 is operated as shown in FIG. 8, the hydraulic pressure thus raised is transmitted through the second hydraulic oil pipe 26 to the second communicating hole 32b as shown in FIG. 9, and is transmitted from the second communicating hole 32b to the oil chamber 221 in the second release cylinder 32 as indicated by arrow D, so that the piston 63 and the rod 64 are moved in the direction of arrow E, and the rod 64 pushes the second roller 122 of the seesaw member 117.

As a result, the seesaw member 117 is rotated in the direction of arrow F, and the first roller 121 moves the rod 44 of the first master cylinder 31 in the direction of arrow G, so that the piston 43 is also moved, to raise the hydraulic pressure inside the oil chamber 78. The hydraulic pressure thus raised is transmitted through the first hydraulic oil pipe 23 to the oil chamber 181A in the cylinder body 181 of the first release cylinder 24 shown in FIG. 7, in the same manner as above-mentioned. Thus, the push rod 25 is moved toward the side of the clutch 11, whereby the clutch 11 is disconnected.

In this instance, in FIG. 9, the protrusion 120a of the seesaw member 117 is separated from the end surface 116a of the worm wheel 116, so that the operation of the clutch lever 14 (see FIG. 3) does not affect the operation on the electric motor 21 side.

In this manner, the system on the electric motor 21 side and the system on the clutch lever 14 side can be operated independently.

As has been shown in FIGS. 2, 8 and 9, in the present invention, the seesaw member 117 is capable of power transmission with the piston 43 as a first master piston provided in the first master cylinder 31 and with the piston 63 as a second release piston provided in the second release cylinder 32, a part of the worm wheel 116 is capable of making contact with the seesaw member 117, and the worm 113 attached to the rotary shaft 81 of the electric motor 21 is meshed with the worm wheel 116. Therefore, it is possible by driving the electric motor 21 to operate the seesaw member 117 through the worm 113 and the worm wheel 116, and it is possible by manually driving the second release cylinder 32 to operate the seesaw member 117 independently from the system on the electric motor 21 side.

Figure 10A:
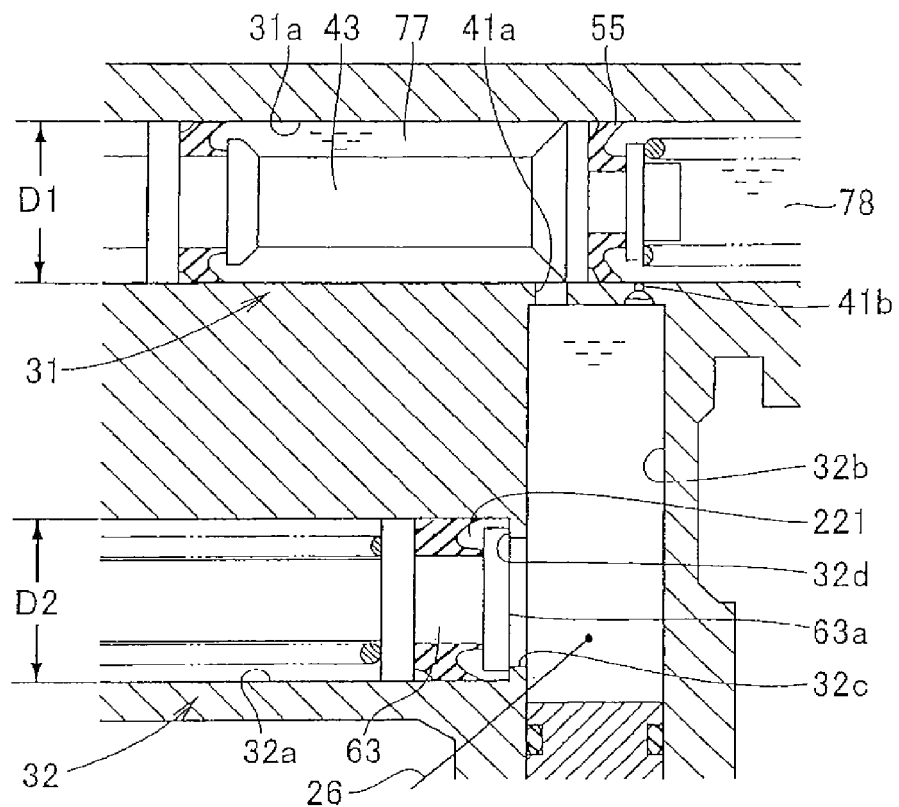
FIGS. 10(a) and 10(b) are third operation views showing an operation of the clutch hydraulic system according to the present invention.
Figure 10B:
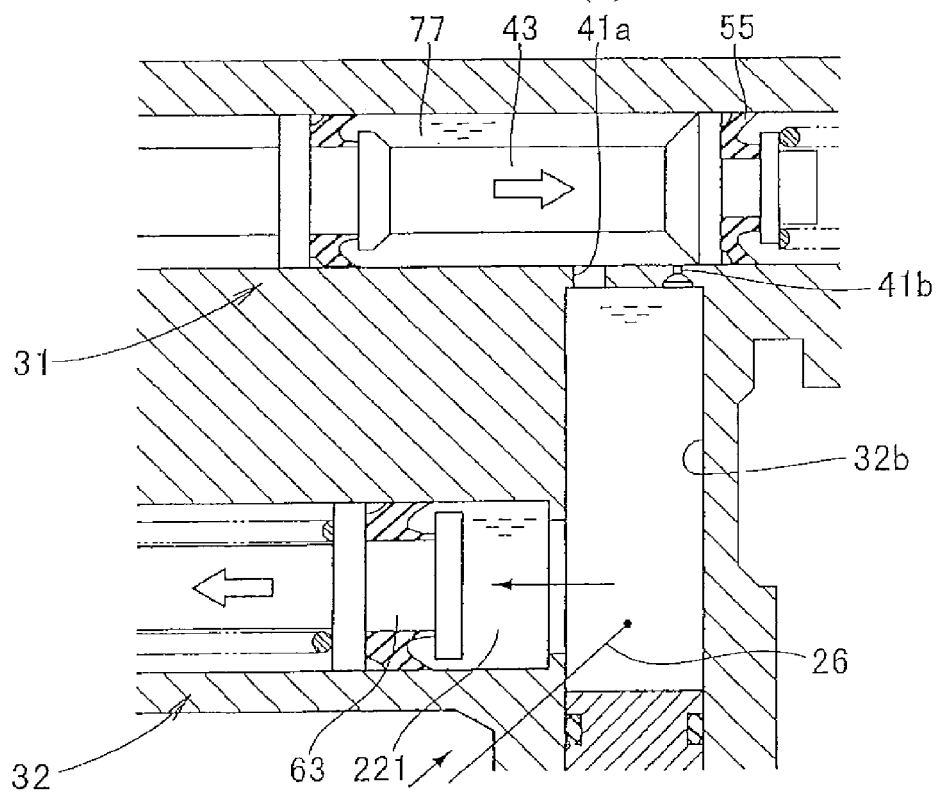

FIGS. 10(a) and 10(b) are third operational views showing an operation of the clutch hydraulic system according to the present invention.

FIG. 10(a) shows the condition before movement of the piston 43 in the first master cylinder 31, i.e., the condition of the first master cylinder 31 and the second release cylinder 32 shown in FIG. 2.

More specifically, the primary cup 55 of the first master cylinder 31 is located between the large diameter hole 41a and the small diameter hole 41b. In addition, the end face 63a of the piston 63 in the second release cylinder 32 abuts on the stepped part 32d.

When hydraulic pressure is transmitted to the second communicating hole 32b in this condition, the hydraulic pressure acts on the piston 43 from the right side through the small diameter hole 41b and the oil chamber 78, on the side of the first master cylinder 31. In addition, on the side of the second release cylinder 32, the hydraulic pressure acts on the piston 63 from the right side through the communication port 32c and the oil chamber 221.

Since the inner diameter D2 of the second cylinder bore 32a is larger than the inner diameter D1 of the first cylinder bore 31a, the pressure-receiving area of the piston 63 in the second release cylinder 32 is greater than the pressure-receiving area of the piston 43 in the first master cylinder 31, so that the force for moving the piston 63 to the left is stronger than the force for moving the piston 43 to the left. Therefore, the piston 63 is moved to the left, and the piston 43 is moved to the right.

In FIG. 10(b), when the piston 43 is moved to the right as indicated by the void arrow and the primary cup 55 is located on the right side relative to the small diameter hole 41b, both the large diameter hole 41a and the small diameter hole 41b front on the oil chamber 77, so that a force for moving the piston 43 is not generated, and only a force for moving the piston 63 by the hydraulic pressure acting on the oil chamber 221 of the second release cylinder 32 is generated.

As illustrated in FIGS. 2, 10(a) and 10(b) above, in the present invention, the inner diameter D2 of the second cylinder bore 32a of the second release cylinder 32 is greater than the inner diameter D1 of the cylinder bore 31a of the first master cylinder 31, so that the pressure-receiving area of the piston 63 in the second release cylinder 32 can be made larger than the pressure-receiving area of the piston 43 in the second master cylinder 31. Therefore, a pushing force can be transmitted from the second release cylinder 32 side to the first master cylinder 31 through the seesaw member 117, and the clutch 11 (see FIG. 1) can be disconnected manually.

In addition, as shown in FIG. 10(a), in the present invention, the large diameter hole 41a and the small diameter hole 41b are opened toward the lower side of the first master cylinder 31. This ensures that, at the time of deaeration of the second hydraulic oil pipe 26, air is made to escape from the second hydraulic oil pipe 26 through the second communicating hole 32b and through the large diameter hole 41a and the small diameter hole 41b, which are located on the upper side of the second communicating hole 32b, into the first master cylinder 31 (more specifically, into the oil chamber 78 in the first cylinder bore 31a) on the further upper side. Thus, deaeration of the second hydraulic oil pipe 26 can be easily performed.

Further, with the second hydraulic oil pipe 26 connected to the second communicating hole 32b located on the lower side of the first master cylinder 31, air having mixed into the oil in the second hydraulic oil pipe 26 can be easily released through the second communicating hole 32b, the large diameter hole 41a and the small diameter hole 41b (which are located on the upper side of the second hydraulic oil pipe 26) into the first master cylinder 31, so that the deaeration operation can be performed efficiently.

Furthermore, in the present invention, the vehicle is a saddle ride type vehicle. Therefore, by providing the saddle ride type vehicle with the single reservoir tank 133, the number of component parts can be reduced, while ensuring that manual clutch connection/disconnection and power-driven clutch connection/disconnection can be performed independently. As a result, a reduction in the cost of the saddle ride type vehicle and effective utilization of the vehicle body space can be realized.

Figure 11:
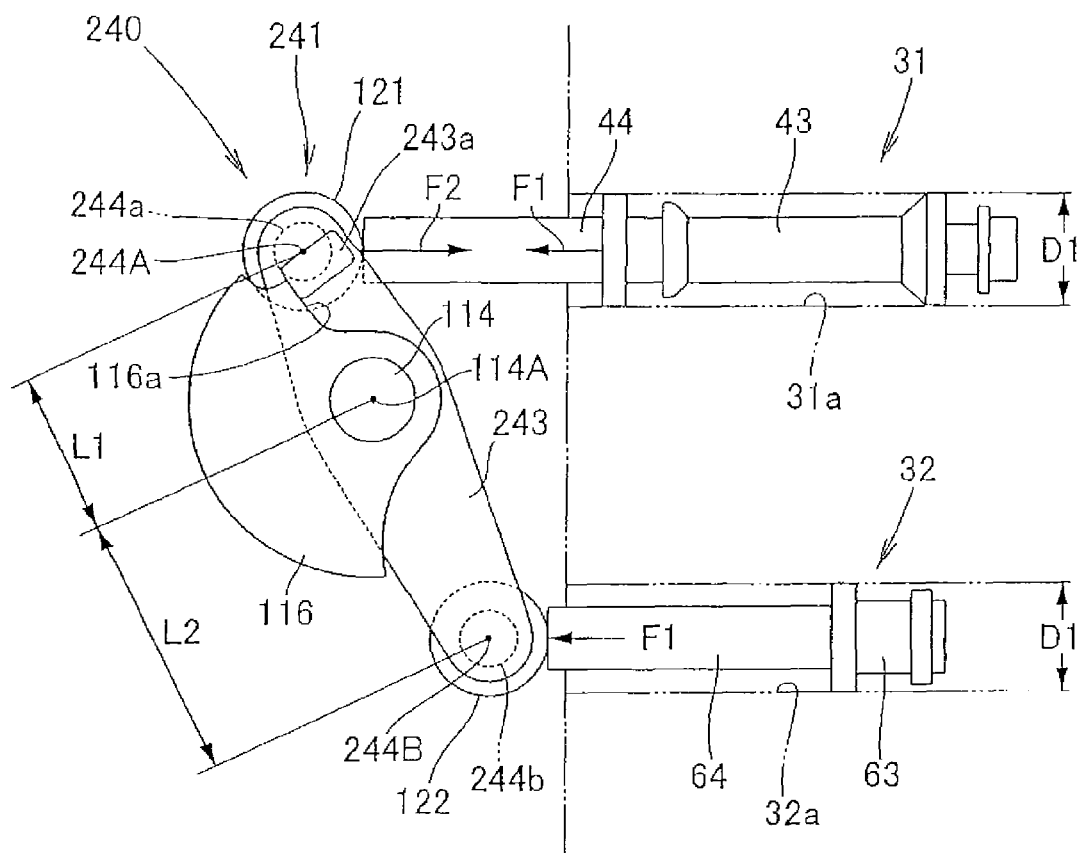
FIG. 11 is a side view showing another embodiment of a pushing force transmitting part according to the present invention.

FIG. 11 is a side view showing another embodiment of the pushing force transmitting part according to the present invention. The same configurations as those in the first embodiment shown in FIG. 2 are denoted by the same symbols as used above, and detailed descriptions of these configurations will be omitted.

A pushing force transmitting part 240 includes a worm 113 (see FIG. 2), a support shaft 114, a worm wheel 116, and a seesaw member 241 rotatably mounted onto the support shaft 114.

The seesaw member 241 includes a seesaw body 243 rotatably supported on the support shaft 114, and a first roller 121 and a second roller 122 which are rotatably mounted onto both ends of the seesaw body 243 through support shafts 244a, 244b, respectively.

While the support shaft 244a and the support shaft 244b are composed of the same member, the shafts are denoted by different symbols for discrimination between them.

The seesaw body 243 is provided at a side surface thereof with a protrusion 243a abutting on an end face 116a of the worm wheel 116.

As illustrated in FIG. 11, axes 244A and 244B of the support shafts 244a, 244b, respectively, are provided. The distance L1 between the axis 114A and the axis 244A and the distance L2 between the axis 114A and the axis 244B satisfy the condition of L2>L1.

For example where the inner diameter of a second cylinder bore 32a is set to be equal to the inner diameter D1 of a first cylinder bore 31a, it is ensured that even when the same leftward pushing force F1 is exerted on a piston 43 and on a piston 63, the pushing force F2 with which the piston 63 pushes the piston 43 through the seesaw member 243 is greater than the pushing force F1.

Thus, a configuration is adopted in which the piston 63 as a manual release piston movably contained in a second release cylinder 32 and the piston 43 as a clutch master cylinder movably contained in a first master cylinder 31 are provided, the second roller 122 (more specifically, the axis 244B of the support shaft 244b of the second roller 122) as one end part of the seesaw member 241 as a power transmitting member is pushed by the piston 63 so as to transmit motive power, whereby the seesaw member 241 is turned about the support shaft 144 (more specifically, the axis 114A of the support shaft 114) serving as a center of turning, whereas the first roller 121 (more specifically, the axis 244A of the support shaft 244a of the first roller 121) as the other end part of the seesaw member 241 pushes the piston 43 so as to transmit motive power, the axis 114A is provided between the axis 244B and the axis 244A, and the distance L2 from the axis 114A to the axis 244B on the piston 63 side is set to be larger than the distance L1 from the axis 114A to the axis 244A on the piston 43 side. This configuration ensures that the moment on the portion, ranging from the axis 144A to the axis 244B on the piston 63 side, of the seesaw member 241 can be made greater than the moment on the portion, ranging from the axis 114A to the axis 244A on the piston 43 side, of the seesaw member 241. Thus, a pushing force can be transmitted from the second release cylinder 32 side to the first master cylinder 31 side through the seesaw member 241, and the clutch 11 (see FIG. 1) can be disconnected manually.

The clutch hydraulic system for a vehicle and the hydraulic system according to the present invention are suitable for application to saddle ride type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch hydraulic system for a vehicle, comprising:
a first clutch hydraulic oil passage which includes a clutch master cylinder for generating hydraulic pressure by motive power given thereto, and a clutch release cylinder to which hydraulic pressure is transmitted from said clutch master cylinder through said first clutch hydraulic oil passage and which disconnects a clutch; and
a second manual hydraulic oil passage which includes a manual master cylinder operated manually to generate hydraulic pressure and a manual release cylinder operated by hydraulic pressure transmitted from said manual master cylinder through said second, manual hydraulic oil passage to thereby generate hydraulic pressure in said clutch master cylinder;
a power transmitting member for transmitting motive power between said manual release cylinder and said clutch master cylinder;
said clutch master cylinder and said second, manual hydraulic oil passage communicating with each other through a communicating passage through which oil flows; and
a reservoir tank for reserving the oil for controlling the amounts of the oil in said first clutch hydraulic oil passage and said second, manual hydraulic oil passage, said reservoir tank being connected to said manual master cylinder, whereby the disconnecting of the clutch by motive power and disconnecting of the clutch manually can be operated independently.

2. The clutch hydraulic system for the vehicle according to claim 1,
wherein said manual master cylinder and said reservoir tank are mounted to a handle provided on said vehicle, and
said manual master cylinder is operated by an operation of a clutch lever provided on said handle.

3. The clutch hydraulic system for the vehicle according to claim 2, wherein a piston pressure receiving area in said manual release cylinder is greater than a piston pressure receiving area in said clutch master cylinder.

4. The clutch hydraulic system for the vehicle according to claim 3,
wherein a part of a worm wheel is adapted to contact said power transmitting member; and
said worm wheel is meshed with a worm attached to a rotary shaft of an electric motor.

5. The clutch hydraulic system for the vehicle according to claim 3, wherein said vehicle is a saddle ride type vehicle.

6. The clutch hydraulic system for the vehicle according to claim 2, further comprising:
a manual release piston movably contained in said manual release cylinder; and
a clutch master piston movably contained in said clutch master cylinder;
wherein said power transmitting member, including one end part which is pushed by said manual release piston to transmit motive power, is turned about a center of turning, and has another end part pressing said clutch master piston to thereby transmit motive power;
said center of turning being provided between said one end part and said other end part; and wherein
the distance from said center of turning to said one end part on the manual release piston side is set to be greater than the distance from said center of turning to said other end part on the clutch master piston side.

7. The clutch hydraulic system for the vehicle according to claim 2, wherein said communicating passage is open toward a lower side of said clutch master cylinder.

8. The clutch hydraulic system for the vehicle according to claim 2,
wherein a part of a worm wheel is adapted to contact said power transmitting member; and
said worm wheel is meshed with a worm attached to a rotary shaft of an electric motor.

9. The clutch hydraulic system for the vehicle according to claim 2, wherein said vehicle is a saddle ride type vehicle.

10. The clutch hydraulic system for the vehicle according to claim 1, wherein a piston pressure receiving area in said manual release cylinder is greater than a piston pressure receiving area in said clutch master cylinder.

11. The clutch hydraulic system for the vehicle according to claim 10, wherein said communicating passage is open toward a lower side of said clutch master cylinder.

12. The clutch hydraulic system for the vehicle according to claim 10,
wherein a part of a worm wheel is adapted to contact said power transmitting member; and
said worm wheel is meshed with a worm attached to a rotary shaft of an electric motor.

13. The clutch hydraulic system for the vehicle according to claim 10, wherein said vehicle is a saddle ride type vehicle.

14. The clutch hydraulic system for the vehicle according to claim 1, and further comprising:
a manual release piston movably contained in said manual release cylinder; and
a clutch master piston movably contained in said clutch master cylinder;
wherein said power transmitting member, including one end part which is pushed by said manual release piston to transmit motive power, is turned about a center of turning, and has another end part pressing said clutch master piston to thereby transmit motive power;
said center of turning being provided between said one end part and said other end part; and wherein
the distance from said center of turning to said one end part on the manual release piston side is set to be greater than the distance from said center of turning to said other end part on the clutch master piston side.

15. The clutch hydraulic system for the vehicle according to claim 14, wherein said vehicle is a saddle ride type vehicle.

16. The clutch hydraulic system for the vehicle according to claim 1, wherein said communicating passage is open toward a lower side of said clutch master cylinder.

17. The clutch hydraulic system for the vehicle according to claim 1,
wherein a part of a worm wheel is adapted to contact said power transmitting member; and
said worm wheel is meshed with a worm attached to a rotary shaft of an electric motor.

18. The clutch hydraulic system for the vehicle according to claim 1, wherein said vehicle is a saddle ride type vehicle.

19. A vehicle containing the clutch hydraulic system of claim 1.

20. A hydraulic system comprising:
a first hydraulic oil passage including a first master cylinder and a first release cylinder to which hydraulic pressure is transmitted from said first master cylinder through said first hydraulic oil passage and which generates hydraulic pressure; and
a second hydraulic oil passage including a second master cylinder, and a second release cylinder operated by hydraulic pressure transmitted from said second master cylinder through a second hydraulic oil passage to generate hydraulic pressure in said first master cylinder;
wherein said first master cylinder and said second hydraulic oil passage communicate with each other through a communicating passage through which oil flows; and
a reservoir tank for reserving the oil for controlling the amounts of the oil in said first hydraulic oil passage and said second hydraulic oil passage, said reserve tank being connected to said second master cylinder.

21. The hydraulic system according to claim 20, wherein said communicating passage is open toward a lower side of a clutch master cylinder.

* * * * *